(12) United States Patent
Haimer

(10) Patent No.: US 10,940,541 B2
(45) Date of Patent: Mar. 9, 2021

(54) SHRINK FIT ADAPTER FOR A COLLET CHUCK

(71) Applicant: FRANZ HAIMER MASCHINENBAU KG, Igenhausen (DE)

(72) Inventor: Franz Haimer, Igenhausen (DE)

(73) Assignee: Franz Haimer Maschinenbau KG, Igenhausen (DE)

( * ) Notice: Subject to any disclaimer, the term of this patent is extended or adjusted under 35 U.S.C. 154(b) by 0 days.

(21) Appl. No.: 16/407,366

(22) Filed: May 9, 2019

(65) Prior Publication Data

US 2019/0344360 A1    Nov. 14, 2019

(30) Foreign Application Priority Data

May 9, 2018 (DE) .......................... 102018111127.4

(51) Int. Cl.
*B23B 31/117* (2006.01)
*B23P 11/02* (2006.01)

(52) U.S. Cl.
CPC ......... *B23B 31/1179* (2013.01); *B23P 11/027* (2013.01); *B23B 2231/04* (2013.01); *Y10T 408/95* (2015.01); *Y10T 409/30952* (2015.01)

(58) Field of Classification Search
CPC ............. B23B 31/1179; B23B 2231/04; B23P 11/027; Y10T 409/30952
See application file for complete search history.

(56) References Cited

U.S. PATENT DOCUMENTS

| | | | |
|---|---|---|---|
| 2,610,066 A * | 9/1952 | Pigott | B23B 31/202 279/51 |
| 6,280,126 B1 * | 8/2001 | Slocum | B23B 31/202 279/52 |
| 6,857,177 B2 * | 2/2005 | Taylor | B23B 31/1179 29/407.05 |
| 7,182,558 B2 * | 2/2007 | Haimer | B23B 31/02 279/4.03 |
| 7,491,023 B2 | 2/2009 | Oesterle | |
| 7,758,289 B2 * | 7/2010 | Haimer | B23B 31/102 279/102 |
| 7,802,950 B2 * | 9/2010 | Neumeier | B23B 31/1179 279/103 |
| 7,938,408 B2 * | 5/2011 | Haimer | B23B 31/00 279/102 |
| 9,061,356 B2 * | 6/2015 | Haimer | B23B 31/1177 |
| 10,040,129 B2 * | 8/2018 | Voss | B23B 31/1179 |

(Continued)

FOREIGN PATENT DOCUMENTS

WO    2004078391 A2    9/2004

*Primary Examiner* — Eric A. Gates
(74) *Attorney, Agent, or Firm* — Laurence A. Greenberg; Werner H. Stemer; Ralph E. Locher

(57) ABSTRACT

A shrink fit adapter for a collet chuck has a rear holding area that can be mounted inside a collet chuck and a front receiving area for holding a tool shank. A through opening runs from a front face of the receiving area to a rear face of the holding area. A clamping area extends into the rear holding area. Here, the adapter is formed with a plurality of slots, which extend radially outward from the through opening and are distributed over the circumference. The slots are arranged in a central area of the through opening and the front ends of the slots are spaced apart from the front face of the receiving area.

16 Claims, 5 Drawing Sheets

(56) References Cited

U.S. PATENT DOCUMENTS

2007/0252344 A1* 11/2007 Retzbach .............. B23B 31/028
  279/55
2019/0070672 A1* 3/2019 Haimer ................... B23B 31/06
2019/0070698 A1* 3/2019 Haimer ................... B23B 31/20

* cited by examiner

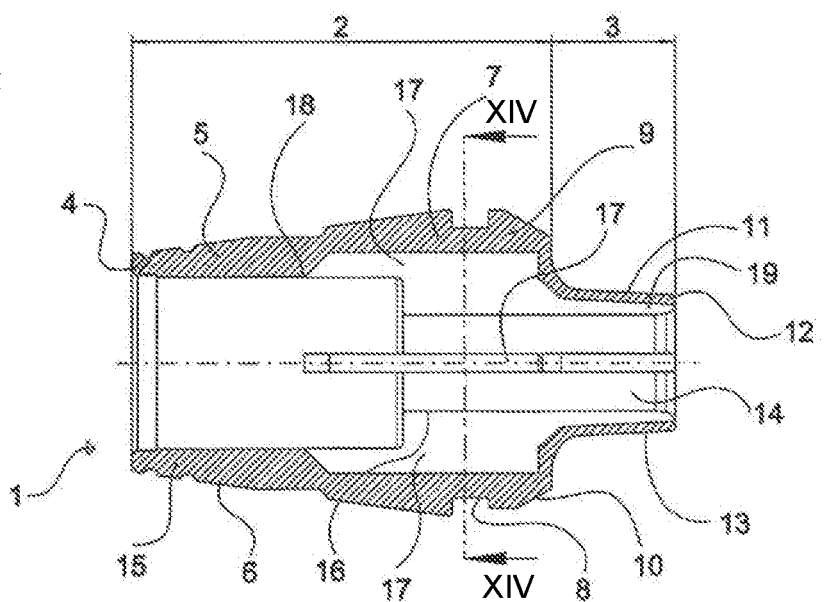
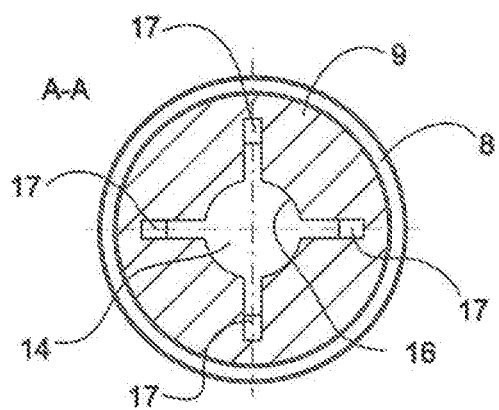
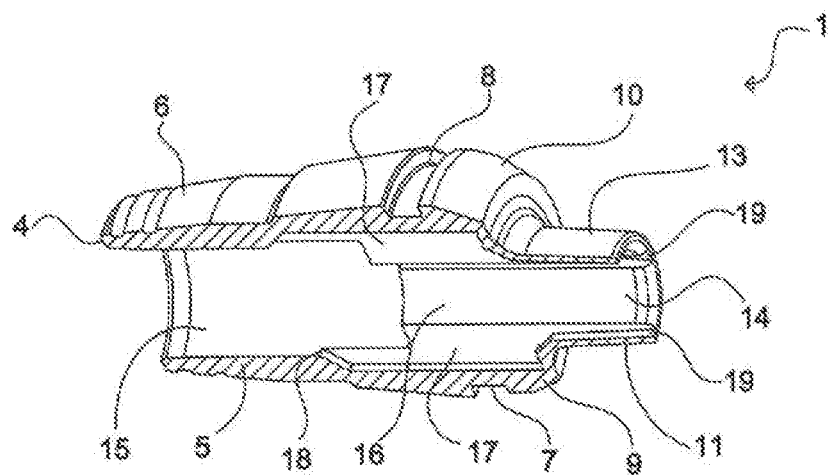

SHRINK FIT ADAPTER FOR A COLLET CHUCK

CROSS-REFERENCE TO RELATED APPLICATION

This application claims the priority, under 35 U.S.C. § 119, of German patent application DE 10 2018 111 127.4, filed May 9, 2018; the prior application is herewith incorporated by reference in its entirety.

BACKGROUND OF THE INVENTION

Field of the Invention

The invention relates to a shrink fit adapter for a collet chuck that includes a rear holding area for being held inside a collet chuck, a front receiving area for holding a tool shank, and a through opening that runs from a front face of the receiving area to a rear face of the holding area, the clamping area of which extends into the rear holding area.

Such shrink fit adapters are known from U.S. Pat. No. 7,491,023 B2 and its counterpart WO 2004/078391 A2. These adapters have a rear conical holding area for holding the shrink fit adapter in a collet chuck, a front receiving area for receiving a tool shank, and a through opening that runs from a front face of the receiving area to a rear face of the holding area, for holding the tool shank. Drill bits or other tools that are furnished with a tool shank may be shrunk into such shrink fit adapters and clamped inside a collet chuck via the shrink fit adapter, with the aid of a clamping nut.

The well-known shrink fit adapters of the type mentioned generally exhibit an uneven distribution of material over the entire length. With smaller shrink fit adapters in particular, this uneven distribution causes the thinner-walled areas to heat up and expand substantially faster than the thicker-walled area in the middle of the shrink fit adapter. This may lead to the problem that during heating, the thin-walled areas heat up excessively before the thick-walled areas reach the temperature required for shrinking. Excessive heating of the thin-walled areas may lead to damage to the shrink chuck and a consequent shortening of the product's service life. In addition, excessive heating of the thin-walled areas may have a negative effect when removing the tool. Because excessive heating also causes the tool shank to heat up, the tool becomes harder to remove, leading to an increased risk of injury from burns.

BRIEF SUMMARY OF THE INVENTION

It is accordingly an object of the invention to provide a shrink fit adapter for a collet which overcomes the above-mentioned and other disadvantages of the heretofore-known devices and methods of this general type.

With the foregoing and other objects in view there is provided, in accordance with the invention, a shrink fit adapter for a collet chuck. The shrink fit adapter comprises:

an adapter body having a rear holding area to be held inside a collet chuck and a front receiving area for holding a tool shank;

the adapter body having a through opening formed from a front face of the receiving area to a rear face of the holding area, and having a clamping area extending into the rear holding area;

the adapter body being formed with a plurality of slots extending radially outward from the through opening, and being distributed over a circumference thereof, the slots being arranged in a central area of the through opening and having front ends spaced apart from the front face of the receiving area.

In other words, the novel shrink fit adapter according to the invention has several slots arranged in a central area of the through opening, running radially outward from the through opening and distributed over the circumference; the ends of these slots are spaced apart from the rear face and the front face. The slots arranged at the through opening act like expansion joints, by means of which the clamping area of the through opening may expand more quickly. The material on the outside of the shrink fit adapter, which heats up more quickly when heated, is more easily able to pull the inner areas radially outward without the inner area having to be thoroughly heated. This accelerated expansion may prevent damage due to excessive heating, thus increasing product service life. In addition, because the more rapid expansion means that the tools are not heated as much, they are easier to remove and the risk of injury from burns is reduced.

The slots may preferably be arranged in a rear part of the clamping area of the through opening. Preferably, the slots also extend into the front receiving area of the shrink fit adapter. Although the slots' principal effect is on shrink sleeves with thick and thin wall areas, they may also be used for short shrink sleeves. Even if the forward receiving area opposite the collet is short, the slots may make it easier for a tool to be shrunk out.

In a particularly preferred embodiment, four slots are furnished in the through opening and are evenly distributed over the circumference. But the number of slots may also be just two, three or more than four.

The depth T of the slots is preferably selected in such a way that the outer wall of the shrink chuck that remains in this area has substantially the same thickness as in the front receiving area. The slots have, for example, a width of 0.5 to 2 mm.

The slots are preferably arranged parallel to a central axis of the shrink fit adapter. They may however also be inclined at an angle with respect to the central axis.

Advantageously, the slots are dimensioned in such a way that they do not interrupt the outer contour of the shrink fit adapter.

However, the slots may also be dimensioned in such a way that there is an opening at the transition from the rear holding area to the front receiving area. A coolant may be fed through this opening to the outside of the front receiving area.

The shrink fit adapter is advantageously suited for various possible applications. For example, it is particularly advantageous to use the shrink adapter in a collet chuck, particularly rotating in a milling machine or rotating or standing in a lathe.

In addition, special (composite) systems result from using the shrink fit adapter in higher-level structural units.

Such a system results in particular when the shrink fit adapter is clamped in a collet chuck using a union nut. Put differently, this system furnishes a collet chuck, a union nut and the shrink fit adapter.

It is also expedient if such a system also has a spindle that is able to be connected to the collet chuck. Alternatively, a spindle may also be furnished that is designed integrally with the collet chuck. In other words, the collet chuck may be an integral part of the spindle.

In addition—in such a system—a tool may be furnished, for example a milling tool or drill bit or turning tool, which is or may be shrunk into the shrink fit adapter.

The above description of advantageous configurations of the invention contains numerous features, some of which are set forth in the individual dependent claims. These features, however, may also expediently be considered individually and may be combined into additional useful combinations. In particular, these respective features may be combined individually and in any suitable combination with uses and/or applications according to the invention.

Even if some terms are used in the singular or in connection with a numerical word in the description or in the patent claims, the scope of the invention for these terms shall not be limited to the singular or to the respective numerical word. Additionally, the words "one" or "a" are not to be understood as numerical words, but as indefinite articles.

The above-described characteristics, features and advantages of the invention described above and the way in which they are achieved, become clearer and more understandable in the context of the following description of the exemplary embodiments of the invention, which are explained in greater detail in the context of the drawing(s)/figure(s) (in the drawings/figures, the same parts/components and functions have the same reference signs). The exemplary embodiments serve to explain the invention and the invention is not limited to the combinations of features specified therein, not even in relation to functional features. In addition, suitable features of each exemplary embodiment may also be viewed explicitly in isolation, separated from one exemplary embodiment, inserted into another exemplary embodiment to supplement it, and combined with any one of the claims.

Other features which are considered as characteristic for the invention are set forth in the appended claims.

Although the invention is illustrated and described herein as embodied in a shrink fit adapter for a collet chuck, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 13 is longitudinal section of an additional exemplary embodiment of a shrink fit adapter;

FIG. 14 is a sectional view of the shrink fit adapter of FIG. 13 along line XIV-XIV of FIG. 13; and FIG. 15 is a sectional, perspective view of the shrink fit adapter of FIG. 13.

DETAILED DESCRIPTION OF THE INVENTION

Figure 1:
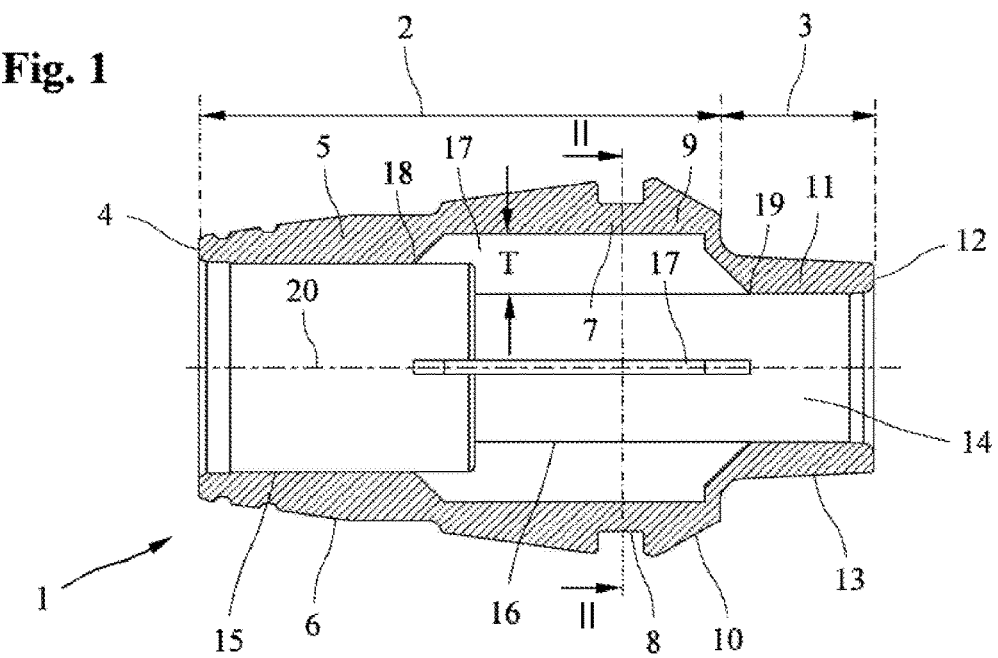
FIG. 1 is a longitudinal section of a first exemplary embodiment of a shrink fit adapter according to the invention.
Figure 3:
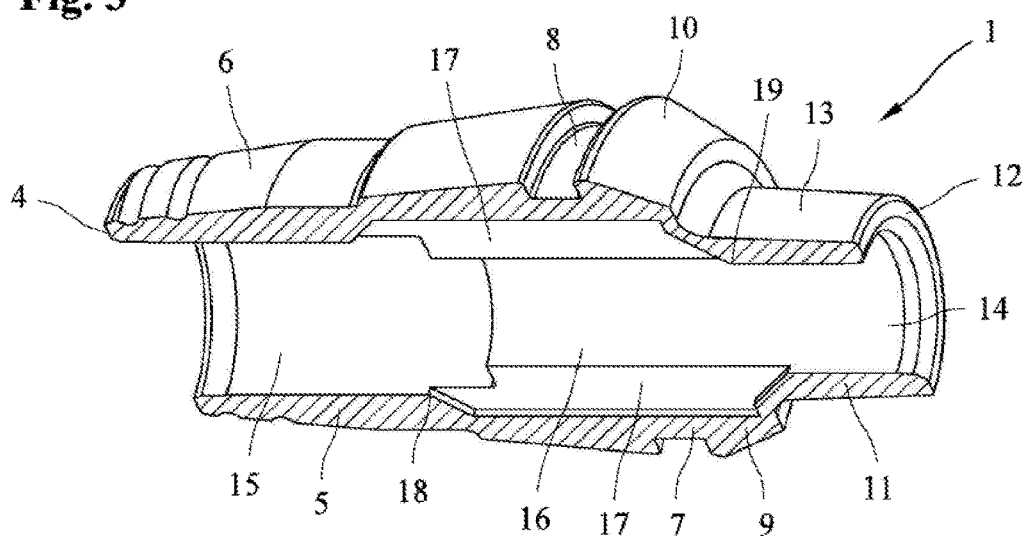
FIG. 3 is a sectional, perspective view of the shrink fit adapter of FIG. 1.

Referring now to the figures of the drawing in detail and first, particularly, to FIGS. 1 and 3 thereof, there is shown a first exemplary embodiment of a shrink fit adapter 1 for a collet chuck, or, simply, collet. A drill bit, a milling cutter or another tool furnished with a tool shank may be shrunk into this shrink fit adapter and may be clamped via the shrink fit adapter in a collet chuck known in the art, by way of a clamping nut.

The shrink fit adapter 1, designed as a rotary body, has a rear holding area 2 for accommodating the shrink fit adapter 1 in a collet chuck, and a tool-side front receiving area 3 for accommodating a tool shank. The rear holding area 2 comprises a conical rear part 5 that tapers toward a rear face 4 with a conical outer surface 6, an extended intermediate part 7 with an outer annular groove 8 and a front part 9 with a conical clamping surface 10. The front receiving area 3 contains a retaining part 11 that protrudes forward from the rear holding area 2 with a front face 12. In the embodiment shown, the retaining part 11 protrudes forward from the conical clamping surface 10 and has an outer surface 13 that tapers conically toward the front face 12. The tool may also be clamped outside the chuck by means of the retaining part 11 that protrudes toward the front, so that the tool's reach is increased.

The shrink fit adapter 1 also contains a central through opening 14 that extends from the rear face 4 to the front face 12, with a rear area 15 having an enlarged diameter and a front clamping area 16. As shown in FIG. 1, the front clamping area 16 extends from the front face 12 through the front receiving area 3 to the rear holding area 2 that is arranged inside the collet chuck. The inner diameter of the through opening 14 in the front clamping area 16 is adapted to the outer diameter of the tool shank of a tool to be clamped and is slightly smaller than the outer diameter of the tool shank. Through heating, the shrink fit adapter 1 may be radially expanded in the clamping area so that the tool shank may be inserted into the through opening 14. When the shrink fit adapter 1 cools and consequently shrinks, the tool is fixed in a form-fitting and force-fitting manner in the clamping area 16 of the through opening 14.

The shrink fit adapter 1 is furnished with a plurality of slots 17 in a central area of the through opening 14 that run radially outward from the through opening 14 and are distributed over the circumference. In the exemplary embodiment shown, four slots 17 are furnished that are evenly distributed over the circumference. But the number of slots 17 may also be just two, three or more than four. The slots 17 are designed in such a way that they do not pass through to the outside of the shrink fit adapter 1, but end before reaching that point. Both the rear end 18 and the front end 19 of the slots 17 are spaced apart from the rear face 4 and front face 12 of the shrink fit adapter 1, respectively.

The depth T of the slots 17 is preferably selected in such a way that the outer wall of the shrink chuck 1 remaining in this area has substantially the same thickness as in the front receiving area 3. The slots 17 preferably have a width of 0.5 to 2 mm. The slots 17 are also arranged substantially parallel to the central axis 18 of the shrink fit adapter 1. They may however also be inclined at an angle of up to approximately 20° with respect to the central axis 18.

FIGS. 3 to 6 show another exemplary embodiment of a shrink fit adapter 1 for a collet chuck. This embodiment differs from the exemplary embodiment of FIGS. 1 to 3 only in the design of the slots 17. In other respects, the shrink fit adapter 1 is constructed in the same way as the embodiment described in detail above; thus, corresponding parts are also furnished with the same reference marks. With regard to the description thereof, refer to the embodiment of FIGS. 1 to 3.

Figure 2:
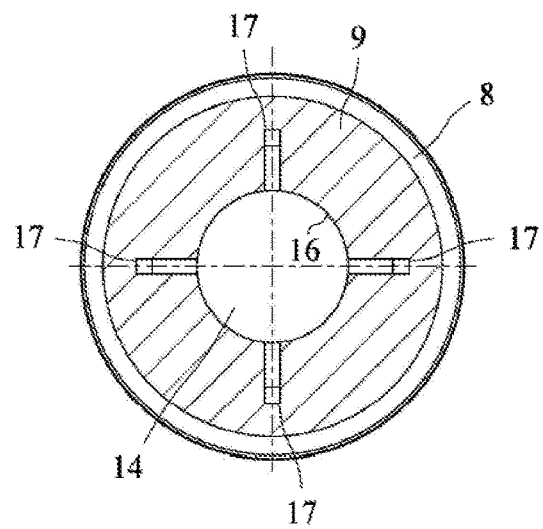
FIG. 2 is a sectional view of the shrink fit adapter of FIG. 1, taken along the line II-II shown in FIG. 1.
Figure 4:
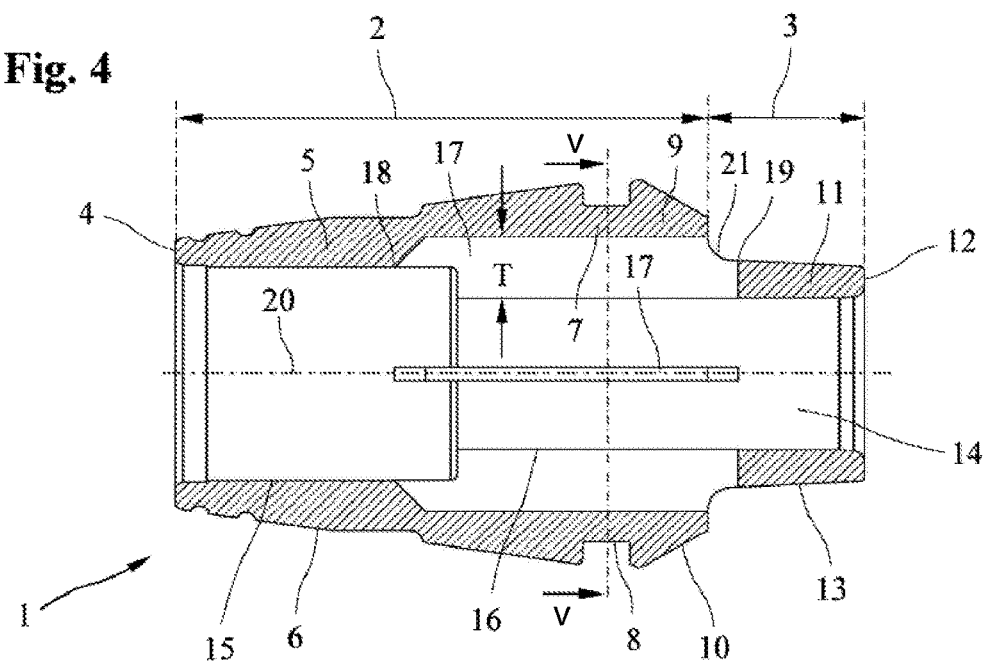
FIG. 4 is a sectional, perspective view of a second exemplary embodiment of a shrink fit adapter.
Figure 5:
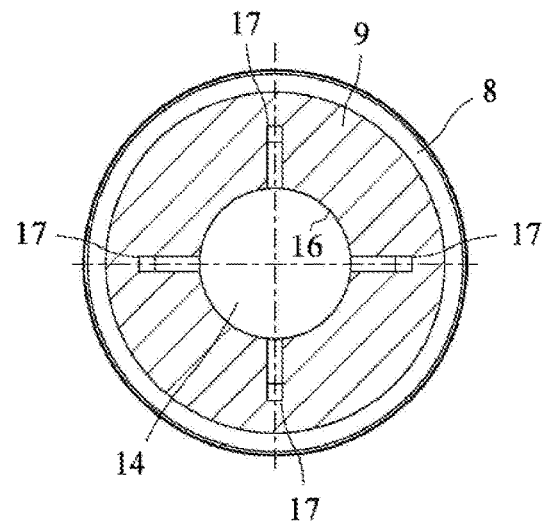
FIG. 5 is a sectional view of the shrink fit adapter of FIG. 4, taken along the line V-V shown in FIG. 4.
Figure 6:
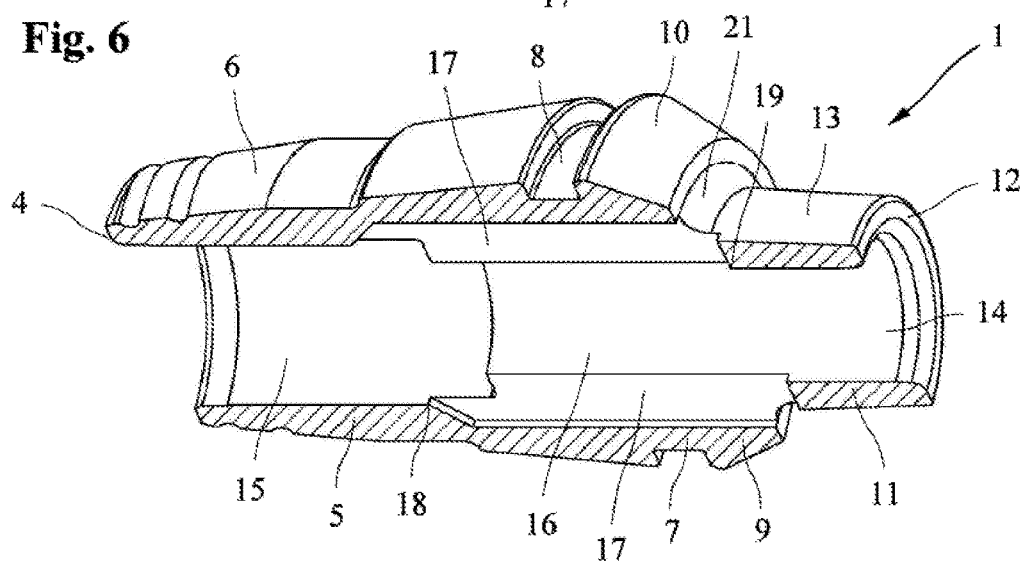
FIG. 6 is a sectional perspective view of the shrink fit adapter of FIG. 4.

In contrast to the embodiment of FIGS. 1 to 3, the slots 17 in the embodiment of FIGS. 4 to 5 extend further into the forward-protruding front receiving area 11, so that there is an opening 21 at the transition from the rear holding area 2 to the front receiving area 3. A coolant may be directed to the outside of the front receiving area 11 through this opening 21.

FIGS. 13 to 15 show another exemplary embodiment of a shrink fit adapter 1 for a collet chuck. This embodiment differs from the exemplary embodiment of FIGS. 1 to 3 only in the design of the slots 17. In other respects, the shrink fit adapter 1 is constructed in the same way as the embodiment described in detail above; thus, corresponding parts are also furnished with the same reference marks. With regard to the description thereof, refer to the embodiment of FIGS. 1 to 3.

In contrast to the embodiment of the shrink fit adapter 1 according to FIGS. 1 to 3, the slots 17 in the embodiment of FIGS. 13 to 15 extend to the front face 12 of the shrink fit adapter 1.

This means that the front ends 19 of the slots 17 in this embodiment of a shrink fit adapter 1 extend to the front face 12—and are not spaced apart from the front face 12 as in the embodiment of the shrink fit adapter 1 according to FIGS. 1 to 3.

A shrink fit adapter 1 as described above may be conventionally produced through an ablative manufacturing process. For example, in this case the slots 17 inside the shrink fit adapter 1 may be worked out using an erosion process. However, production may also be done using an additive manufacturing process. In this case, for example, the entire shrink fit adapter 1 together with the slots 17 may be produced using a metal printing process.

Figure 8:
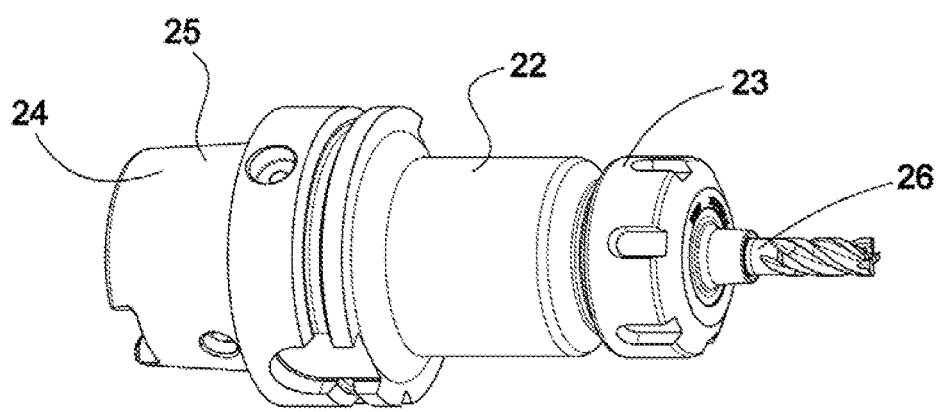
FIG. 8 is a perspective view of the system of FIG. 7.
Figure 9:
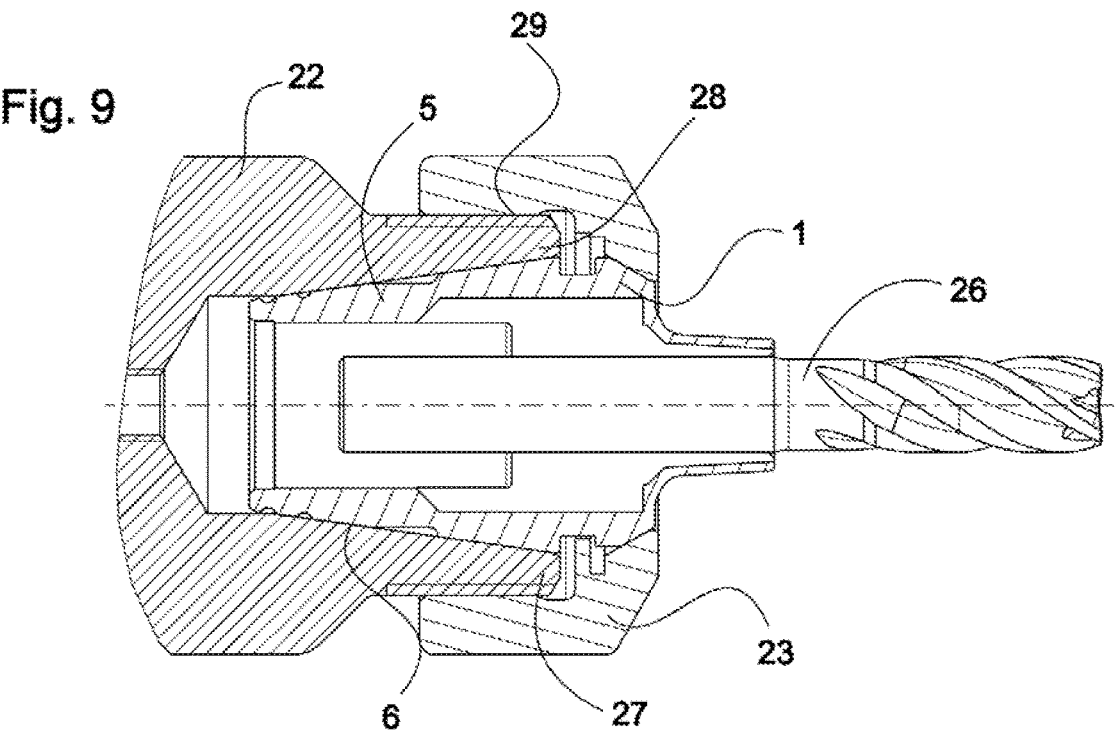
FIG. 9 is a longitudinal section showing a detailed representation of the system of FIG. 7.
Figure 10:
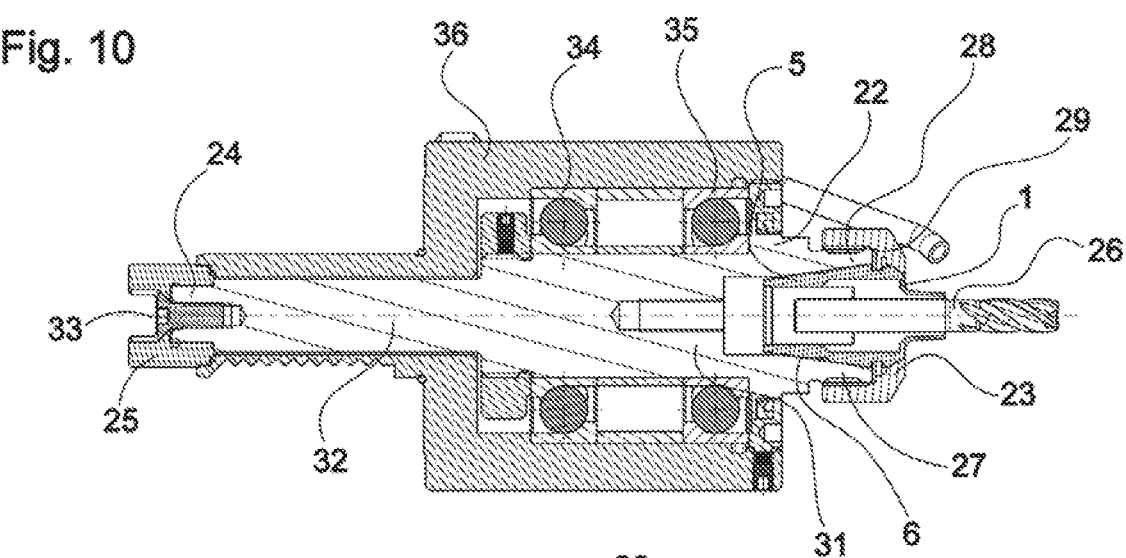
FIG. 10 is a longitudinal section showing a second exemplary embodiment of a system with a spindle mounted in a housing and having an integrated collet chuck; a shrink fit adapter; a clamping nut; and a tool.
Figure 11:
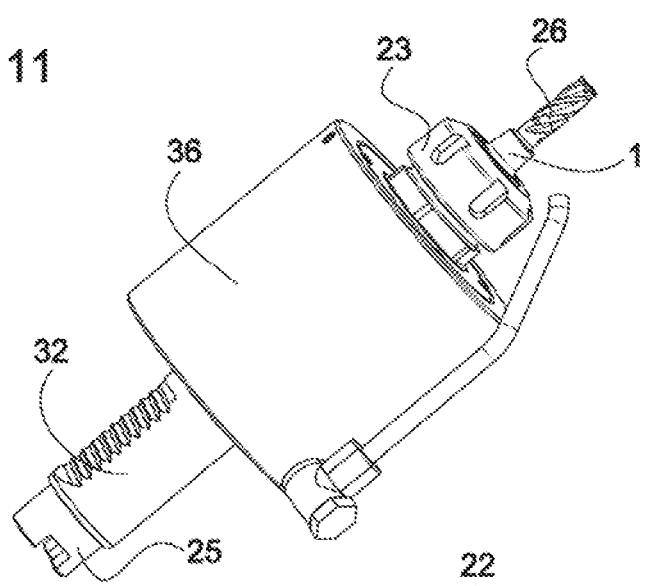
FIG. 11 is a perspective view of the system of FIG. 10.
Figure 12:
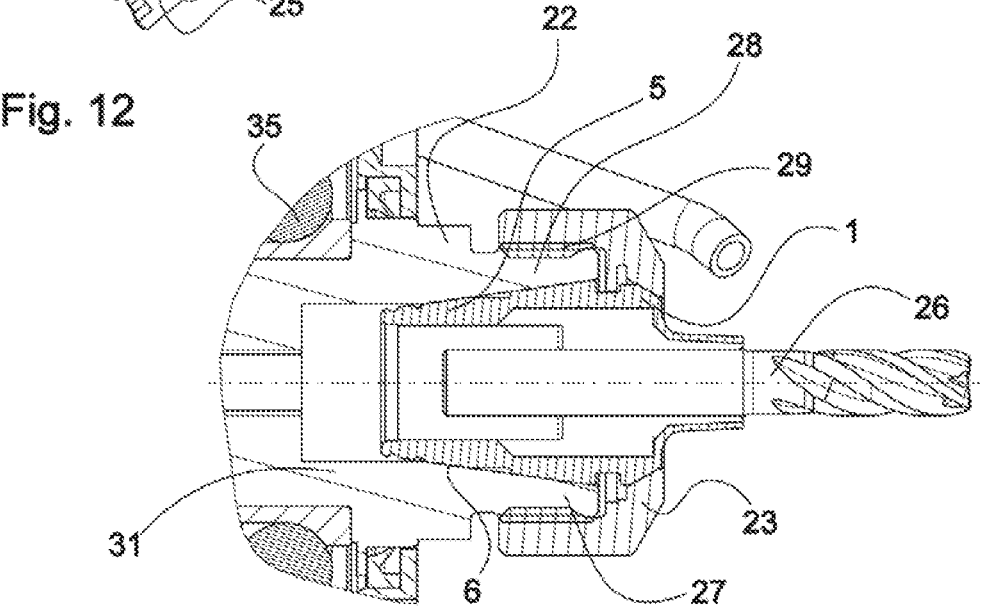
FIG. 12 is a longitudinal section showing a detailed representation of the system of FIG. 7.

FIGS. 7 to 9 and 10 to 12 each show a shrink fit adapter 1, for example the one according to the embodiment of FIGS. 1 to 3, for use with a milling machine (FIGS. 7 to 9) or lathe (FIGS. 10 to 12).

Notwithstanding these illustrations, the other shrink fit adapters 1 according to FIGS. 4 to 6 or 13 to 15 may also be used in a corresponding manner—in such milling machines and lathes.

Figure 7:
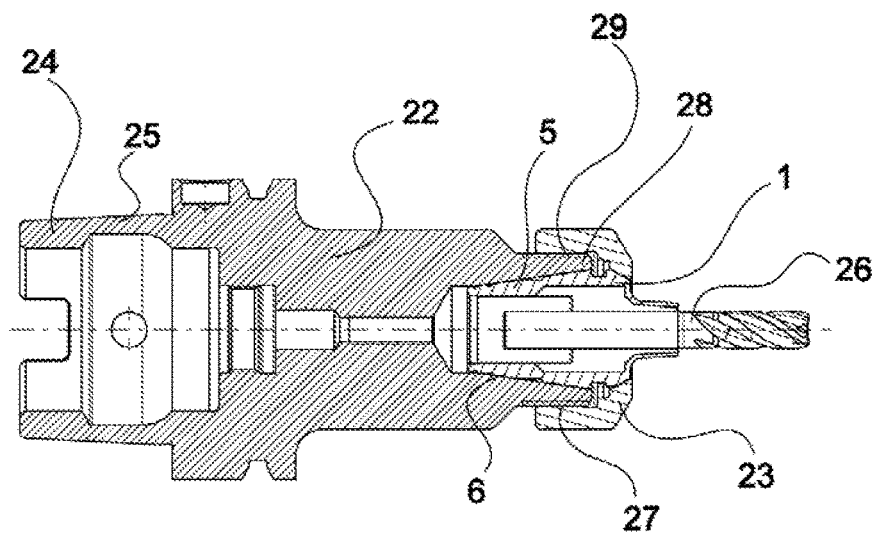
FIG. 7 is a longitudinal section of a first exemplary embodiment of a system with a collet chuck, a shrink fit adapter, a clamping nut, and a tool.

FIGS. 7 to 9 illustrate how a rotary tool 26, in this case a milling cutter for use in a milling machine, may be fastened to a spindle of the milling machine (not shown) by means of the shrink fit adapter 1, via a collet chuck 22 that clamps onto the shrink fit adapter 1.

As FIGS. 7 and 8 show, the collet chuck 22 provides an interface 25 with the spindle at its end 24 facing away from the rotary tool or milling cutter 26, here for example a hollow shank taper or HSK. Other standardized interfaces 25 may also be furnished, such as a steep taper (SK).

At the other end 27 of the collet chuck 22 opposite the HSK 25, the clamping area 28—in the form of a conical receptacle 28—is formed for the shrink fit adapter 1 that has the shrunk-in rotary tool or milling cutter 26, as shown in FIGS. 7 to 9, and this clamping area 28 tapers toward the spindle.

For use in the collet chuck 22, the rotary tool or here the milling cutter 26 is first shrunk into the shrink fit adapter 1. Then the shrink fit adapter 1—by means of its conical rear part 5 or conical outer surface 6—is inserted into the conical receptacle 28 of the collet chuck 22 together with the rotary tool or milling cutter 26, and is pressed into the conical receptacle 28 of the collet chuck 22 using a clamping nut or union nut 23, as shown in FIGS. 7 to 9.

The union nut 23 itself engages in an external thread 29 on the collet chuck 22 that is furnished for this purpose in the clamping area 28 of the collet chuck 22. The union nut 23 is axially displaced by rotation. Due to the conical shape, the shrink fit adapter 1 is pressed into the conical receptacle 28 and as a result, the bond between the shrink fit adapter 1 and this shrunk-in rotary tool or milling cutter 26 is held both frictionally and positively.

FIGS. 10 to 12 illustrate an additional use of the shrink fit adapter 1, here again for example according to the embodiment of FIGS. 1 to 3—in this case—rotating on a lathe (FIGS. 10 to 12).

FIGS. 10 to 12 show how a rotary tool 26, or likewise here a milling cutter 26, may be used—rotating—in a lathe, by means of the shrink fit adapter 1 on the lathe (not shown).

The collet chuck 22 is designed as an integral front part 31 of a spindle 32, as FIGS. 10 and 11 in particular show.

At its far end 24 from the rotary tool or milling cutter 26, the spindle 32 provides an interface 25—in the form of a connecting element 25 that is screwed onto this spindle end 24 by means of a countersunk screw 33—for transmitting the rotary movement to spindle 32. Through this interface, the rotary tool or milling cutter 26 may be rotated by means of a rotationally fixed coupling to a drive unit on the lathe.

At the other spindle end 27 that is located opposite this (coupling) interface 25 and forms the collet chuck 22, as FIGS. 10 to 12 show, the clamping area 28—in the form of a conical receptacle 28—is formed for the shrink fit adapter 1 that has the shrunk-in rotary tool or milling cutter 26, and this clamping area 28 tapers toward the (coupling) interface 25.

For use in the collet chuck 22, the rotary tool or here the milling cutter 26 is first shrunk into the shrink fit adapter 1. The shrink fit adapter 1—by means of its conical rear part 5 or conical outer surface 6—is then inserted into the conical receptacle 28 of the collet chuck 22 together with the rotary tool or milling cutter 26, and then is pressed into the conical receptacle 28 of the collet chuck 22 using a clamping nut or union nut 23, as FIGS. 10 to 12 show.

The union nut 23 itself engages in an external thread 29 on the collet chuck 22 that is furnished for this purpose in the clamping area 28 of the collet chuck 22. The union nut 23 is axially displaced by rotation. Due to the conical shape, the shrink fit adapter 1 is pressed into the conical receptacle 28 and the composite of the shrink fit adapter 1 and this shrunk tool 26 is held in place (in the collet chuck 22 or spindle 32) both frictionally and positively.

As FIGS. 10 and 11 show, two angular contact ball bearings 34, 35 support the spindle 32 and are braced on the spindle 32 inside a housing 36, in this case a VDI adapter 36, which is or may be plugged into a turret of the lathe.

The use case of the shrink fit adapter 1 depicted in FIGS. 10 to 12 describes the case of a tool 26 that rotates on the lathe or a collet chuck 22 that rotates on the lathe with a shrink fit adapter 1—tool 26 composite clamped therein; in contrast, in a correspondingly adapted design, the tool 26—and thus the collet chuck 22 with shrink fit adapter 1 and tool 26 may also be furnished—standing—on lathes.

Although the invention has been illustrated and described in detail using the preferred exemplary embodiment, the examples disclosed herein do not limit the invention, and other variations may be derived herefrom without departing from the protected scope of the invention.

The following is a summary list of reference numerals and the corresponding structure used in the above description of the invention:

1 Shrink fit adapter
2 Rear holding area
3 Front receiving area
4 Rear face
5 Conical rear part
6 Conical outer surface
7 Intermediate part
8 Annular groove
9 Front part
10 Conical clamping surface
11 Retaining part
12 Front face
13 Conical outer surface
14 Through opening
15 Rear area
16 Front clamping area
17 Slot
18 Rear end of slot
19 Front end of slot
20 Central axis
21 Opening
22 Collet chuck
23 Union/clamping nut
24 End
25 Interface, HSK
26 (Rotary) tool, milling cutter
27 (Spindle) end
28 Clamping area, conical receptacle
29 External thread
31 Integral front part
32 Spindle
33 Countersunk screw
34 Angular contact ball bearings
35 Angular contact ball bearings
36 Housing, VDI adapter

The invention claimed is:

1. A shrink fit adapter for a collet chuck, the shrink fit adapter comprising:
a shrink fit adapter body having a rear holding area to be held inside a collet chuck and a front receiving area for holding a shank;
said shrink fit adapter body having a through opening formed from a front face of said receiving area to a rear face of said holding area, and having a clamping area extending into said rear holding area;
said shrink fit adapter body being formed with a plurality of slots extending radially outward from said through opening, and being distributed over a circumference thereof, said slots being arranged in a central area of said through opening and having front ends spaced apart from said front face of said receiving area, said slots being formed with rear ends that are spaced apart from said rear face of said holding area.

2. The shrink fit adapter according to claim 1, wherein said slots are arranged in a rear portion of said clamping area of said through opening.

3. The shrink fit adapter according to claim 1, wherein said slots extend into said front receiving area.

4. The shrink fit adapter according to claim 1, wherein said slots are two or more than two slots uniformly distributed over the circumference and arranged in said through opening.

5. The shrink fit adapter according to claim 1, wherein said slots are four slots distributed uniformly over the circumference and arranged in said through opening.

6. The shrink fit adapter according to claim 1, wherein a depth of said slots is selected in such a way that an outer wall of said shrink fit adapter body remaining in an area of the slots has substantially the same thickness as in said front receiving area.

7. The shrink fit adapter according to claim 1, wherein said slots have a width of 0.5 to 2 mm.

8. The shrink fit adapter according to claim 1, wherein said slots extend parallel to a central axis of the shrink fit adapter.

9. The shrink fit adapter according to claim 1, wherein said slots are dimensioned in such a way that said slots do not break through an outer contour of the shrink fit adapter.

10. The shrink fit adapter according to claim 1, wherein said slots are dimensioned to form an opening at a transition said the rear holding area to said front receiving area.

11. The shrink fit adapter according to claim 1, mounted in a collet chuck and rotatably disposed in a milling machine or rotating or standing in a lathe.

12. A system, comprising:
a collet chuck and a union nut; and
a shrink fit adapter according to claim 1 to be clamped in said collet chuck by said union nut.

13. The system according to claim 12, further comprising a spindle to be connected to said collet chuck, or a spindle integrally formed with said collet chuck.

14. The system according to claim 12, further comprising a tool configured to be shrunk into said shrink fit adapter.

15. The system according to claim 14, wherein said tool is selected from the group consisting of a milling tool, a drill bit, and a turning tool.

16. A shrink fit adapter for a collet chuck, the shrink fit adapter comprising:
an adapter body having a rear holding area to be held inside a collet chuck and a front receiving area for holding a tool shank;
said adapter body having a through opening formed from a front face of said receiving area to a rear face of said holding area, and having a shrink-fitting clamping area for clamping the tool shank, said shrink fitting-clamping area extending into said rear holding area;
said adapter body being formed with a plurality of slots extending radially outward from said through opening, and being distributed over a circumference thereof, said slots being arranged in a central area of said through opening and having front ends spaced apart from said front face of said receiving area.

* * * * *